United States Patent Office 2,831,858
Patented Apr. 22, 1958

2,831,858

OXAZINE AND OXAZOLINE DERIVATIVES

Peter L. de Benneville and Leo S. Luskin, Philadelphia, Pa., assignors to Rohm & Haas Company, Philadelphia, Pa., a corporation of Delaware No Drawing. Application May 11, 1956
Serial No. 584,173

19 Claims. (Cl. 260—244)

This invention relates to 2-oxazolines and 5,6-dihydro-4H-1,3-oxazines and a process for their manufacture. More particularly this invention concerns 4,4-dialkyl-2-vinyl and 4,4-dialkyl-2-isopropenyl substituted oxazolines and identically substituted 5,6-dihydro-4H-1,3-oxazines.

This invention also concerns the 2-isopropenyl and 2-vinyl spirans formed when the 2-isopropenyl and 2-vinyl substituted oxazolines and identically substituted 5,6-dihydro-4H-1,3-oxazines are joined, through a common, i. e., spiro carbon atom, namely the 4-carbon of the oxazoline or of the 5,6-dihydro-4H-1,3-oxazine heterocycle, to a divalent saturated aliphatic hydrocarbon group.

This invention also deals with the polymers and copolymers formed with these 2-isopropenyl and 2-vinyl oxazolines and 5,6-dihydro-4H-1,3-oxazines.

The compounds of this invention have the following formula:

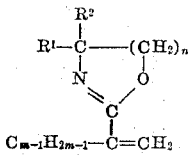

in which $(CH_2)_n$ is an alkylene group of one to two carbon atoms, $R^1$ and $R^2$ when taken individually are alkyl radicals, one being methyl and the other containing not more than eight carbon atoms, or $R^1$ and $R^2$ when taken together form a divalent saturated aliphatic hydrocarbon group containing four to nine carbon atoms, which together with the carbon to which $R^1$ and $R^2$ are bonded forms a five- to six-sided carbocycle, $m$ is an integer from one to two inclusive and $n$ is an integer from one to two inclusive.

The 4,4-dialkyl-2-vinyl and the 4,4-dialkyl-2-isopropenyl substituted oxazolines and identically substituted 5,6-dihydro-4H-1,3-oxazines and the spirans thereof are made by reacting under conditions which are discussed in detail further below, amino-alcohols or alkanolamines having the formula:

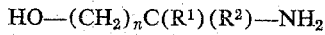

in which $n$, $R^1$, and $R^2$ are as defined above, with acryloyloxyalkanes or methacryloyloxyalkanes, that is lower alkyl esters of acrylic and methacrylic acid, having the formula:

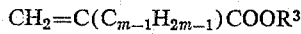

in which $R^3$ is an alkyl radical containing from one to four carbon atoms, in the presence of a polymerization inhibitor and of a metal alkoxide of the formula $M(OR^4)_x$, in which M is a metal selected from the group of the metals of atomic number from 13 to 40 from groups III–A and IV–B of the periodic table, $x$ has the same numerical value as the valency of the metal M, and $R^4$ is an alkyl radical preferably of not over five carbon atoms.

Normally, the reaction of acrylic or methacrylic esters with primary aminoalcohols results in a complicated series of side reactions which apparently involve, especially at high temperatures, a preferential formation of the alkylhydroxyalkyl amide of the unsaturated ester. In the presence of an alkaline catalyst such as sodium methoxide, there usually occurs addition of the amine across the double bond of the unsaturated ester. This is the general course of reaction with ethanolamine, propanolamine, and other similar primary amines. For instance, when propanolamine is reacted with ethyl acrylate, there is obtained ethyl β-(hydroxypropylamino)propionate. Often, in the absence of a polymerization inhibitor, the reaction is further complicated by the formation of a reaction mixture containing considerable polymeric material. In an isolated case, a primary amino higher alcohol has been observed to form an aminoalkyl ester when that higher alcohol is reacted, under special conditions, with an ester of acrylic or methacrylic acid. Neither in the reaction of the unsaturated esters with conventional aminoalcohols nor with the amine of a long-chained alcohol substituent can there be isolated heterocyclic compounds with an intact isopropenyl or vinyl substituent.

It is, therefore, very surprising, in view of the knowledge of these reactions, to find that when an acrylic or methacrylic ester is reacted under specific conditions with a special alkanolamine, we are able to obtain 2-vinyl or 2-isopropenyl substituted heterocyclic compounds, more specifically such substituted oxazolines and 5,6-dihydro-4H-1,3 oxazines and the spirans thereof.

We have found that the reaction appears to require amino-alcohols in which to the carbon atom adjacent to the amino group there are bonded two alkyl radicals. Preferably, to the tertiary carbon atom, onto which the amino group is bonded, there is bonded a methyl radical, while the other alkyl radical bonded to the tertiary carbon preferably is limited to eight carbon atoms. Alternatively, the tertiary carbon atom is part of a cycloalkyl radical preferably containing five to ten carbon atoms. While these somewhat unconventional aminoalkanols may have a higher alkyl substituent on the tertiary carbon, to be operative, these amino-alcohols are limited to those having a lower alcohol, $HO-(CH_2)_n-$, ($n$ being as defined above) on the tertiary carbon onto which the alkyl and amino radicals also are bonded.

These aminoalcohols can conveniently be prepared by methods known in the art such as by the method of Blomquist and Verdol, J. Am. Chem. Soc. 77, 78 (1955), Wheatley, J. Am. Chem. Soc. 76, 2833 (1954), Brown and Van Gulick, J. Am. Chem. Soc. 77, 1079 (1955), and Newman and Edwards, J. Am. Chem. Soc. 76, 1840, (1954). These methods and known others can readily be applied to the preparation of the desired aminoalcohol.

Typical alkanolamines which advantageously can be used to react with the esters of acrylic or methacrylic acid and which are represented by the above general formula are:

3-amino-3-methyl-1-octanol
3-amino-3-methyl-1-heptanol
3-amino-3-methyl-1-hexanol
3-amino-3-methyl-1-pentanol
3-amino-3-methyl-1-butanol
3-amino-3-methyl-1-isohexanol
3-amino-3-methyl-4-isopropyl-1-heptanol
3-amino-3-methyl-5,6-diethyl-1-octanol
3-amino-3-methyl-4-ethyl-5-methyl-1-octanol
3-amino-3,4-dimethyl-1-pentanol
3-amino-3-methyl-1-hendecanol
3-amino-3-methyl-1-decanol
3-amino-3-methyl-1-nonanol
3-amino-3-methyl-4-ethyl-1-nonanol
3-amino-3,4-dimethyl-1-heptanol
3-amino-3,4,5-trimethyl-1-nonanol
2-amino-2-methyl-1-decanol 2-amino-2-methyl-1-nonanol
2-amino-2-methyl-1-octanol
2-amino-2-methyl-1-hexanol
2-amino-2-methyl-1-pentanol
2-amino-2-methyl-1-butanol
2-amino-2-methyl-1-propanol
2-amino-2-methyl-1-isohexanol
2-amino-2,3,4-trimethyl-1-octanol
2-amino-2-methyl-3,4-diethyl-1-hexanol
2-amino-2,3-dimethyl-1-pentanol
2-amino-2,3-dimethyl-1-butanol
1-amino-1-($\alpha$-hydroxymethyl)cyclohexane
1-amino-1-($\alpha$-hydroxymethyl)cyclopentane
1-amino-1-($\beta$-hydroxyethyl)cyclohexane
1-amino-3,5-dimethyl-1-($\beta$-hydroxyethyl)cyclohexane
1-amino-3,5-dimethyl-1-($\alpha$-hydroxymethyl)cyclohexane
1-amino-2,2-dimethyl-1-($\alpha$-hydroxymethyl)cyclopentane
1-amino-2,2-dimethyl-1-($\beta$-hydroxyethyl)cyclopentane
1-amino-2,3-dimethyl-5-ethyl-1-($\beta$-hydroxyethyl)cyclohexane
1-amino-2,3-dimethyl-5-ethyl-1-($\alpha$-hydroxymethyl)cyclohexane
1-amino-2,3-dimethyl-5-ethyl-1-($\alpha$-hydroxymethyl)cyclopentane
1-amino-2,3-dimethyl-5-ethyl-1-($\beta$-hydroxyethyl)cyclopentane It is to be noted that apparently the more common alkali metal alkoxides are inoperative in this process since it seems that, if they are substituted for the special catalysts required herein, the resulting mixtures are undesirable amides. We have found that the reaction of the alkanolamines with the esters of acrylic or methacrylic acid is desirably promoted by the presence of a metal alkoxide of the general formula $M(OR^4)_x$, in which M is a metal selected from the metals of atomic number from 13 to 40 inclusive selected from group III-A and IV-B of the periodic table, $x$ is an integer having the same numerical value as the valence of the metal and ranges from three to four inclusive, and $R^4$ preferably is a lower alkyl group of one to five carbon atoms. Higher alkoxides are also effective, the preference for lower alkyl is merely for convenience and availability reasons. Typical organo metal alkoxide catalysts include aluminum butoxide, aluminum isopropoxide, aluminum ethoxide, aluminum propoxide, aluminum methoxide, aluminum octoxide, aluminum hexoxide, tetra-n-butyl titanate, tetraisopropyl titanate, tetra-n-hexyl titanate, zirconium tetraisopropoxide, and the alkoxides of gallium. The catalysts should be used in an amount from about 0.1 to about 25% preferably from about 5 to 20% by weight of the alkanolamine used. Aluminum alkoxides, especially aluminum isopropoxide, and tetraisopropyl titanate, in an amount from about 5 to about 20% by weight of the alkanolamine, are very efficient catalysts.

As acryloyloxyalkanes or methacryloyloxyalkanes which are reacted in the presence of the metal alkoxide catalyst there may be used such typical acrylic esters as methyl acrylate, ethyl acrylate, isopropyl acrylate, n-butyl acrylate, methyl methacrylate, ethyl methacrylate, n-butyl methacrylate, isobutyl methacrylate, isopropyl methacrylate, tert-butyl methacrylate, tert-butyl acrylate, hexyl methacrylate, and 2-ethylhexyl acrylate.

In reacting the acryloyloxyalkanes or the methacryloyloxyalkanes with the alkanolamines there should be taken at least about 1.5 moles of the ester and there may be used as much as four moles per mole of alkanolamine. Commonly there are used two moles or more of the ester for each mole of alkanolamine to insure high yields of the oxazolines and the 4H-1,3-oxazines. A ratio of 2:1 (ester:alkanolamine) is favored since it is efficient and economical. The excess of ester of about two moles or more is helpful in insuring complete and efficient reaction of the amine and is therefore favored. The excess of ester also is helpful in order to follow the progress of the reaction, since, as the reaction approaches the end, the temperature at the head of the fractionating column approaches the boiling point of the unsaturated ester. The unreacted ester serves also as a solvent, and it is easily removed from the product as, for example, by distillation.

In the reaction of the acrylic or methacrylic ester, there should also be present a polymerization inhibitor to prevent the formation of insoluble polymeric products. It is, therefore, desirable to use esters containing such an inhibitor or to add polymerization inhibitors like di-$\beta$-naphthol, hydroquinone, p-hydroxydiphenylamine, N,N'-diphenylphenylenediamine, 2,5-di-tert-butylhydroquinone, trinitrotoluene, copper carbonate, or methylene blue. These have been found particularly effective for this purpose and other similar inhibitors are well known in the art. The inhibitor should be used in an amount from about 0.1 to about 10%, preferably from about 0.5 to about 5% by weight based on the acrylic or methacrylic ester.

The effectiveness of the organometallic catalyst being somewhat increased when water is substantially removed from the initial reactants, it is preferable, though not necessary, to start with substantially anhydrous reactants. Any conventional method of the art is well suited for drying the starting materials, and this may also be performed in one operation as part of the steps of this process by first heating the mixture of the ester and the alkanolamine to the temperature at which water distills off, this being at a temperature from about 80° C. to about the boiling point of the ester. As the water is liberated, the ester is returned to the reaction mixture. Then the temperature is lowered and the organometallic catalyst is then added and heating is continued. This may be done in any appropriate equipment such as in a flask equipped with a short packed column with an adjustable total reflux stillhead. Customarily, the overhead temperature is carefully maintained as close as possible to the boiling point of the alcohol-unsaturated ester azeotrope. The azeotropic mixture of the alcohol and acrylic or methacrylic ester has a boiling point which depends on the alkyl substituent of the ester since the alkanol $R^3OH$ which distills off during the reaction is made up from that substituent. For example, the boiling points in degrees centigrade at 760 mm. pressure of the ester and of the azeotropic mixtures of some purified acrylates and methacrylates with their corresponding alkanols, are shown below:

| Ester | Boiling Point | Azeotropes | Boiling Point |
| --- | --- | --- | --- |
| Methyl acrylate | 80.3 | Methanol+methyl acrylate. | 62 |
| Ethyl acrylate | 99.7 | Ethanol+ethyl acrylate | 77.5 |
| Methyl methacrylate | 100.6 | Methanol+methyl methacrylate. | 64.2 |

The boiling point of the azeotropic mixture close to which the temperature at the head of the fractionating is preferably maintained is below the boiling point of the unsaturated acrylic or methacrylic ester. It is, therefore, recommended that the temperature at the head of the distillation column preferably be maintained within the range from about the boiling point of the azeotropic mixture of the ester and the alkanol which is formed therefrom and the boiling point of the ester and preferably as close as possible to the former temperature. For example, for methyl methacrylate and the azeotrope formed with methyl methacrylate and methanol that temperature range is from about 64.2° C. to about 100° C. at 760 mm. pressure and the preferred range is from about 64° to 84° C. However, a temperature of about 62° C. may very conveniently be used too when methyl acrylate is the unsaturated ester. Although heating to about at least the boiling point of the azeotropic mixture is essential for successful production of oxazolines and 5,6-dihydro-4H-1,3-oxazines, the temperature at the head of the column may go up as high as about 163° C. at normal pressure when the unsaturated ester is n-butyl methacrylate and correspondingly higher or lower according to the particular unsaturated ester used.

The temperature in the pot is carefully controlled to prevent polymerization of the product. Although temperature at about 100° C. is operative, preferably, the pot temperature is maintained between about 110° and about 130° C., by operating under reduced pressure, if necessary, to avoid undue heating. In this manner, resulting correspondingly lower pot and head temperatures are obtained. For instance 400 mm. can be conveniently used and under reduced pressure temperatures at the overhead of about 47°-64° C. are found to be very effective.

It is to be noted that we are successful in preparing the 2-vinyl and 2-isopropenyl-substituted oxazolines and the identically substituted 5,6-dihydro-4H-1,3-oxazines and the spirans formed therefrom, at reacting temperatures substantially below those commonly used to prepare known oxazolines.

The progress of the reaction can conveniently be followed by measuring the amount of alkanol of reaction which distills off and by following the rise of the temperature since at the end of the reaction the temperature approaches the boiling point of the acrylic or methacrylic ester. Thereafter any excess ester is removed preferably by distillation, leaving the oxazoline or the 5,6-dihydro-4H-1,3-oxazine product, which subsequently can be purified by such conventional methods as extracting or distilling, for example, under reduced pressure.

It is to be noted that in the process of this invention the substituents represented by R¹ and R² remain intact and appear in the final 5,6-dihydro-4H-1,3-oxazines and oxazolines in the same position as they do in the respective starting reactants.

Typical of the new compounds which are made by this process are:

2-isopropenyl-4,4-dimethyloxazoline
2-isopropenyl-4-methyl-4-ethyloxazoline
2-isopropenyl-4-methyl-4-propyloxazoline
2-isopropenyl-4-methyl-4-butyloxazoline
2-isopropenyl-4-methyl-4-hexyloxazoline
2-isopropenyl-4-methyl-4-octyloxazoline
2-isopropenyl-4-methyl-4-(2'-ethyl)hexyloxazoline
2-isopropenyl-4-methyl-4-(2',3'-dimethyl)butyloxazoline
2-vinyl-4,4-dimethyloxazoline
2-vinyl-4-methyl-4-ethyloxazoline
2-vinyl-4-methyl-4-propyloxazoline
2-vinyl-4-methyl-4-butyloxazoline
2-vinyl-4-methyl-4-pentyloxazoline
2-vinyl-4-methyl-4-heptyloxazoline
2-vinyl-4-methyl-4-octyloxazoline
2-vinyl-4-methyl-4-(2'-ethyl)hexyloxazoline
2-isopropenyl-4,4-dimethyl-5,6-dihydro-4H-1,3-oxazine
2 - isopropenyl - 4 - methyl - 4 - ethyl - 5,6 - dihydro - 4H-1,3-oxazine
2 - isopropenyl - 4 - methyl - 4 - butyl - 5,6 - dihydro - 4H-1,3-oxazine
2 - isopropenyl - 4 - methyl - 4 - isobutyl - 5,6 - dihydro-4H-1,3-oxazine
2 - isopropenyl - 4 - methyl - 4 - propyl - 5,6 - dihydro-4H-1,3-oxazine
2 - isopropenyl - 4 methyl - 4 isopentyl - 5,6 - dihydro-4H-1,3-oxazine
2 - isopropenyl - 4 - methyl - 4 - hexyl - 5,6 - dihydro - 4H-1,3-oxazine
2 - isopropenyl - 4 - methyl - 4 - (2' - ethyl)hexyl - 5,6-dihydro-4H-1,3-oxazine
2 - isopropenyl - 4 - methyl - 4 - (3' - propyl)pentyl - 5,6-dihydro-4H-1,3-oxazine
2 - isopropenyl - 4 - methyl - 4 - octyl - 5,6 - - dihydro - 4H-1,3-oxazine
2-vinyl-4,4-dimethyl-5,6-dihydro-4H-1,3-oxazine
2-vinyl-4-methyl-4-ethyl-5,6-dihydro-4H-1,3-oxazine
2-vinyl-4-methyl-4-butyl-5,6-dihydro-4H-1,3-oxazine
2 - vinyl - 4 - methyl - 4 - (3' - ethyl)pentyl - 5,6 - dihydro-4H-1,3-oxazine
2-vinyl-4-methyl-4-hexyl-5,6-dihydro-4H-1,3-oxazine
2-vinyl-4-methyl-4-octyl-5,6-dihydro-4H-1,3-oxazine
2'-isopropenyl-spiro[cyclohexane-1,4'-oxazoline]
2'-vinyl-spiro[cyclohexane-1,4'-oxazoline]
2'-vinyl-spirol[cyclopentane-1,4'-oxazoline]
2,4-dimethyl-2'-vinyl-spiro[cyclopentane-1,4'-oxazoline]
2'-isopropenyl-spiro[cyclopentane-1,4'-oxazoline]
2,2 - dimethyl - 2' - isopropenyl - spiro[cyclopentane-1,4'-oxazoline]
2,4 - dimethyl - 2' - isopropenyl - spiro[cyclohexane - 1,4'-oxazoline]
2 - ethyl - 3,5 - dimethyl - 2' - isopropenyl - spiro[cyclohexane-1,4'-oxazoline]
2 - ethyl - 3,5 - dimethyl - 2' - vinyl - spiro[cyclohexane-1,4'-oxazoline]
1,2 - dimethyl - 2' - isopropenyl - spiro[cyclopentane - 1,4'-oxazoline]
2' - isopropenyl - spiro[cyclohexane - 1,4' - (5',6' - dihydro-4'H-1',3'-oxazine)]
2' - vinyl - spiro[cyclohexane - 1,4' - (5',6' - dihydro-4'H-1',3'-oxazine)]
2' - vinyl - spiro[cyclopentane - 1,4' - (5',6' - dihydro-4'H-1',3'-oxazine)]
2' - isopropenyl - spiro[cyclopentane - 1,4' - (5',6' - dihydro-4'H-1',3'-oxazine)]
2,4 - dimethyl - 2' - isopropenyl - spiro[cyclohexane - 1,4'-(5',6'-dihydro-4'H-1',3'-oxazine)]
1,2 - diethyl - 2' - isopropenyl - spiro[cyclohexane - 1,4'-(5',6'-dihydro-4'H-1',3'-oxazine)]
2,4 - dimethyl - 2' - vinyl - spiro[cyclohexane - 1,4' - (5',6'-dihydro-4'H-1',3'-oxazine)]

Since only the hydroxy, the amino, and the carboxy groups react during the process of this invention, the procedure of the examples below illustrating the preparation of some of the compounds of this invention is substantially identical and is followed regardless of the particular hydrocarbon substituent R¹, R², R³, and R⁴ represent.

The 4,4-dialkyl-2-vinyl or 4,4-dialkyl-2-isopropenyl substituted oxazolines, the identically substituted 5,6-dihydro-4H-1,3-oxazines, and the spirans thereof are useful fungicides for controlling fungi on plants. For this purpose, they may be formulated into sprays or dusts. These compounds may be dissolved in an organic solvent miscible with water and the resulting solution extended with water to give a dispersion; preferably though, these compounds may be used in the form of emulsifiable concentrates or in solid carriers.

An emulsifiable concentrate can be prepared by dissolving 25 parts of any one of the compounds of this invention in 71 parts of an organic solvent to which four parts of an emulsifier have been added. As solvent, there may be used naphtha, xylene, or the like. Advantageous emulsifiers include such non-ionic agents as alkylphenoxypolyethoxyethanols, methylene bis(diamylphenoxypolyethoxyethanols), oleic acid-polyglycerol condensates, and the like.

Wettable powders are prepared by taking up from 20 to 25 parts of a 5,6-dihydro-4H-1,3-oxazine or oxazoline of this invention in about 71 parts of a finely divided solid, such as clay, and incorporating 2 to 3% of a dispersing agent such as the sodium salt of condensed naphthalene-formaldehyde sulfonates and of a wetting agent such as one of the above non-ionic agents or sodium dodecyl sulfate or sodium octylphenoxyethoxyethoxyethylsulfonate. Similar mixtures with smaller amounts of dispersing and/or wetting agents or even without these agents can be prepared for use as dusts. The usual level in dusts of the oxazolines and oxazines of this invention is about 0.5 to 10%.

The fungicidal action of the compounds of this invention was evaluated by standard fungitoxicity tests. Against *Macrosporium sarcinaeforme* and *Sclerotinia fructicola*, 2-isopropenyl-4,4-dimethyloxazoline gave a 91% and a 100% inhibition of germination of spores respectively when applied in a wettable powder prepared as shown above, then mixed in an amount of 10 to 12 lbs. per 50 gallons of spray. Effective control of brown rot on stone fruits is obtained when the active compounds are prepared in sprays or dusts. Effective control of early blight on potatoes, tomatoes, and eggplants can be achieved upon application in sprays or dusts. Sprays made up with 2-vinyl-4,4-dimethyl-5,6-dihydro-4H-1,3-oxazine can effectively be used to combat brown rot for example, as bud sprays or fruit sprays one or two months before ripening. Early blight can be controlled on potatoes, tomatoes, and eggplants specially by leaf applications. When 2-isopropenyl-4,4-dimethyl-5,6-dihydro-4H-1,3-oxazine is tested on tomato plants, it shows no phytotoxicity in concentrations up to 1%.

Other 5,6-dihydro-4H-1,3-oxazines and oxazolines of this invention are likewise active as fungicides and may be similarly compounded into sprays and dusts, for example.

The monomers of this invention are also useful on cellulosic material such as paper and cloth fabrics for protection from mold or fungi attack. For such purpose the monomers can be added to paper and textile compositions. Examples are paper sizing compositions, textile compositions, dressings, conditioning compositions for rendering fibers, yarns, and filaments more amenable for textile processing, conditioning, spinning, weaving or knitting. The monomers can be added as inhibitors for fungi or molds in compositions used in leather treatment or other coated articles.

*Example 1*

There are mixed 89 g. (1 mole) of 2-amino-2-methyl propanol, and 200 g. (2 moles) of methyl methacrylate, and 10 g. of di-β-naphthol in a reaction vessel equipped with short packed column, an adjustable total reflux stillhead, a stirrer, a thermometer, and a dropping funnel. The mixture is briefly refluxed and there is drained off about 0.5 ml. of water. There is then introduced 2.5 g. of aluminum isopropoxide and the mixture is carefully distilled at high reflux ratio. The overhead temperature is maintained between about 73° and 82° C.; methanol and some methyl methacrylate are taken off as slowly as possible. The pot temperature is maintained between 106° and 114° C. during nine hours of heating. The methanol obtained is 93% of the calculated amount. During nine hours of reaction, 75 ml. of distillate is taken off; the index of refraction at 25° C. is 0.76. The temperature at the top of the fractionating column rises to 93° C. and in the pot to 125° C. The residue in the pot is distilled carefully, preferably in vacuo, removing the excess methyl methacrylate, yielding 2-isopropenyl-4,4-dimethyloxazoline. The purified product boils at 58°–59° C./24 mm.; the neutralization equivalent is 142 and it has an index of refraction of 1.453 at 25° C.; 10.0% nitrogen found, theoretical 10.1%. Infra-red examination shows the characteristic two strong peaks at 1658 and 1615 cm.$^{-1}$ assigned to a conjugated system of C=C and C=N bonds, respectively.

*Example 2*

In the same manner, 3-amino-3-methyl-1-butanol (1 mole) and methyl methacrylate (2 moles) and 10 g. of p-hydroxydiphenylamine are reacted in the presence of 2.5 g. of aluminum isopropoxide; methanol distills off. The temperature at the head of the fractionating column approaches 95° C. The final product is 2-isopropenyl-4,4-dimethyl-5,6-dihydro-4H-1,3-oxazine.

Analysis shows the following: boiling point 58°–65° C./13 mm.; index of refraction 1.4558 at 25° C., neutralization equivalent found 156, theoretical 171; nitrogen found 9.1; calculated 8.8; infra-red examination showed the characteristic 2-band system at 1648 and 1618 cm.$^{-1}$.

*Example 3*

In Example 1, instead of introducing di-β-naphthol, there is substituted 4.5 g. of tetraisopropyl titanate, and the procedure is carried out precisely in the same manner. The final product, 2-isopropenyl-4,4-dimethyloxazoline, is obtained in yields above 60%.

*Example 4*

The same procedure, as in Examples 1 and 2, is repeated with substitution of tetraisopropyl titanate by about 1.0 to 5 g. of aluminum propoxide, aluminum ethoxide, aluminum methoxide, or zirconium isopropoxide.

In every case there is isolated 2-isopropenyl-4,4-dimethyloxazoline when the starting material is 2-amino-2-methyl propanol, and there is isolated 2-isopropenyl-4,4-dimethyl-5,6-dihydro-4H-1,3-oxazine when the starting material is 3-amino-3-methyl-1-butanol.

*Example 5*

A mixture of 89 g. (1 mole), of 2-amino-2-methyl propanol and methyl acrylate 172 g. (2 moles) of methyl acrylate and 15 g. of di-β-naphthol is heated under a 4-inch packed column and total reflux head for one hour. About one ml. of water is collected. Two grams of tetraisopropyl titanate is added, and the distillate, methanol, is collected intermittently at a temperature of about 63° to about 72° C. After four hours an additional 2.0 g. of tetraisopropyl titanate is added to the reaction through the dropping funnel. Again, after 11 hours, 1.0 g. of catalyst is again added. After 15 hours of heating, the temperature rises to about 77° C. at the overhead and to about 125° C. in the pot.

Total methanol collected is about 81% of calculated amount. The residual liquid is distilled under vacuo, removing excess methyl acrylate and substantially yielding 2-vinyl-4,4-dimethyloxazoline. The purified product boils at 54° C. under 32 mm. pressure; the index of refraction is $n_D^{25}$ 1.435. This product is not quite as pure as that obtained in Example 1, but it is entirely satisfactory for use as a monomer, as a fungicide, or a chemical intermediate.

*Example 6*

There are mixed 117 g. (1 mole) of 3-amino-3-methyl-1-pentanol and 172 g. of methyl acrylate and 15 g. of di-β-naphthol to which there is added 5 g. of tetraisopropyl titanate, and upon following the same procedural steps as in Example 5, there is collected 2-vinyl-4-methyl-4-ethyl-5,6-dihydro-4H-1,3-oxazine.

In Example 6, instead of di-β-naphthol, there is used hydroquinone, trinitrotoluene, or 2,5-di-tert-butylhydroquinone in amounts from 10 to 15 g. which are added to the reaction all at once or intermittently; polymerization is equally well inhibited.

*Example 7*

There are mixed 159 g. (1 mole) of 2-amino-2-methyl-1-octanol and 200 g. of methyl methacrylate (2 moles), and 15 g. of di-β-naphthol in a reaction vessel with a water separator. The mixture is refluxed to remove any water. There is then introduced about 8 g. of aluminum methoxide; the temperature at the head of the column is maintained between about 65° and 75° C. while methanol is distilled off. The pot temperature is about 120° C. When the temperature reaches about 98° C. at the head the reaction appears complete; excess methyl methacrylate is distilled off under reduced pressure. The residue is 2-isopropenyl-4-methyl-4-hexyloxazoline which is purified by shaking with saturated calcium chloride solution, extracting with benzene, and evaporation of benzene. Infra-red examination of this product demonstrates the presence of two strong peaks at 1658 cm.$^{-1}$ and 1615 cm.$^{-1}$, assigned to a conjugated system of C= and C=N bonds respectively.

Example 8

In the same fashion as in Example 7, 2-amino-2-methyl-1-pentanol 200 g. of methyl methacrylate are reacted using about 12 g. of aluminum butoxide. The final product obtained is 2-isopropenyl-4-methyl-4-propyloxazoline, the composition being confirmed by analysis.

Example 9

Following the same procedure, 3-amino-3,7-dimethyl-1-octanol (175 g.) is reacted with 172 g. methyl acrylate using a molar ratio of one-half and 14 g. of aluminum methoxide. After 10 hours as the temperature rises to about 79° C. the reaction appears completed; the product is 2-vinyl-4-methyl-4-isohexyl-5,6-dihydro-4H-1,3-oxazine; its composition is confirmed by analysis.

Example 10

In the same manner, one mole of 2-amino-2,3-dimethyl-1-pentanol is reacted with ethyl methacrylate (228 g.) in the presence of tetraisopropyl titanate; the reaction is stopped when, after about 12 hours during which ethanol is taken off, the temperature rises to about 115° C. at the head of the column and the pot temperature reaches 125° C. The residue, principally, is 2-isopropenyl4-methyl-4-(1'-methyl)propyloxazoline. The same procedure is repeated but the operation is carried out under reduced pressure at 400 mm. thus keeping the pot temperature below 110° C. and obtaining a better yield of 2-vinyl-4-methyl-4-(1'-methyl)propyloxazoline.

Example 11

One mole of 2-amino-2-methyl-1-hexanol and 228 g. of ethyl acrylate are mixed in a reaction vessel with about 12 g. of di-β-naphthol and the mixture is heated with gentle refluxing for one hour. There is collected 2 ml. of water. Tetraisopropyl titanate (10 g.) is added thus depressing the temperature at the head of the column to within a range of about 78° to 100° C. The preparation is then continued under reduced pressure (350 mm.) thus generally maintaining the temperature below 110° C. at the head and below 125° C. in the pot. One gram portions of tetraisopropyl titanate are added every four hours during the entire period of heating. The distillate, ethanol, is collected. After 16 hours the temperature at the head of the column approaches the boiling point temperature of the ethyl acrylate. The fluid reaction mixture is then distilled under reduced pressure removing excess ethyl acrylate and the product is essentially 2-vinyl-4-methyl-4-butyloxazoline. This compound is useful, for example, as a fungicide. It may be used in polymerization reactions.

Example 12

The same general procedure, as in Example 11, is followed starting with 3-amino-3-methyl-1-hendecanol. The product which is obtained is 2-vinyl-4-methyl-4-octyl-5,6-dihydro-4H-1,3-oxazine which is particularly useful as an agent for ore classification and for imparting water-repellency to leather.

In Example 11, ethyl acrylate is substituted by isobutyl methacrylate. The operation is carried out under reduced pressure thus keeping the overhead temperature below 150° C. During the reaction isobutyl alcohol principally distills off. The final product is 2-isopropenyl-4-methyl-4-butyloxazoline.

Similarly, in Example 12, upon substitution of ethyl acrylate by isobutyl methacrylate, there is obtained 2-isopropenyl-4-methyl-4-octyl-5,6-dihydro-4H-1,3-oxazine.

Instead of using tetraisopropyl titanate there can be used equally effective alkoxides of aluminum, alkoxides of gallium or zirconium in an amount from 5–20% based on the alkanolamine.

Equally good polymerization inhibition is obtained when there is used p-hydroxydiphenylamine, hydroquinone, or trinitrotoluene.

Example 13

129.2 g. of 1-amino-1-(α-hydroxymethyl)cyclohexane and 220 g. of methyl methacrylate containing about one gram of p-hydroxydiphenylamine are heated together under the column with 600 mm. pressure; six grams of tetraisopropyl titanate over a period of about four hours. The distillation takes place in eight hours and there is collected 60% of the theoretical methanol. Distillation of the residue gives a fraction which is 2'-isopropenyl-spiro[cyclohexane-1,4'-oxazoline], which has a boiling point of 62°–80° C. at 12 mm., the refractive index, $n_D^{25}$, is 1.485, neutralization equivalent 175.3, calculated is 179.3. Infra-red examination shows the characteristic 2-band system at 1658 and 1613 cm.$^{-1}$. This compound may be made up in fungicidal compositions; it is useful in the preparation of polymers and copolymers, and it may be used as an agent for wool stabilization.

Example 14

Repetition of the above procedure with substitution of methyl methacrylate with methyl acrylate yields a fairly pure fraction of 2'-vinyl-spiro[cyclohexane-1,4'-oxazoline].

Example 15

143 g. of 1-amino-1-(β-hydroxyethyl)cyclohexane and 220 g. of methyl methacrylate are reacted in a similar way yielding 2'-isopropenyl-spiro[cyclohexane-1,4'(5',6'-dihydro-4'H-1',3'-oxazine)] in fair purity.

2'-vinyl-spiro[cyclohexane-1,4'(5',6'-dihydro-4'H-1',3'-oxazine)] is obtained by replacing methyl methacrylate by methyl acrylate.

Example 16

2,5-diethyl-2'-isopropenyl-spiro[cyclohexane-1,4'(5',6'-dihydro-4'H-1',3'-oxazine)] is the product obtained from 1-amino-2,5-diethyl-1-(β-hydroxyethyl)cyclohexane by following the same general procedure.

2,5-diethyl - 2' - vinyl-spiro[cyclohexane - 1,4'(5',6'-dihydro-4'H-1',3'-oxazine)] is obtained where methyl acrylate is reacted with the same alkanolamine. These compounds are useful, for instance, in the classification of ores and as fungicides.

Example 17

2,4-diethyl - 2' - isopropenyl-spiro[cyclohexane-1,4'-oxazoline] is a fairly pure product obtained by reacting 1-amino-2,4-diethyl-1-(α-hydroxymethyl)cyclohexane with methyl methacrylate by generally following the same method.

Substitution of methyl methacrylate by methyl acrylate gives 2,4-diethyl-2'-vinyl-spiro[cyclohexane - 1,4' - oxazoline].

The monomers made from the compounds of this invention are useful chemical intermediates. They can be hydrolyzed with bases or acids giving, for example, hydroxyaminoethyl methacrylates or acrylates. The monomers can be quaternized by treatment with alkylating agents.

The monomers of this invention, especially those with higher $R^1$ or $R^2$ alkyl substituents, are very useful for the classification of ores. When dissolved in water they are effective flotation agents.

The monomeric 2-vinyl and 2-isopropenyl substituted oxazolines or identically substituted oxazines and the spirans formed therefrom are polymerizable with the aid of a free-radical catalyst such as one or more azo-type catalysts. These are compounds in which the —N=N— group is attached to aliphatic carbons at least one of which is a tertiary carbon atom. One of the carbon atoms bonded to the tertiary carbon atom has its remaining valences satisfied by at least one element from the class consisting of oxygen and nitrogen. Typical catalysts are azodiisobutyronitrile, azodiisobutyramide, dimethyl-, diethyl-, or dibutylazodiisobutyrate, azobis($\alpha,\gamma$-dimethylvaleronitrile), azobis($\alpha$-methylbutyronitrile), azobis ($\alpha$-methylvaleronitrile), dimethyl- or diethylazobismethylvalerate, and the like. One or a mixture of catalysts may be used in amounts of about 0.05% to 2% based on the weight of the monomer. Polymerization may be effected in bulk, in solution, or in emulsion. In the last case use of a redox system is very effective. Temperatures of polymerization range between 0° and 100° C., a range of 40° to 80° C. being preferred.

Copolymers are readily prepared from the oxazolines and 5,6-dihydro-4H-1,3-oxazines of this invention with other vinylidene compounds which are polymerizable with free radical catalysts. While polymerizable monovinylidene compounds are preferred, there may also be used polyvinylidene compounds. Catalysts for interpolymers are the same as those discussed above for polymer formation.

Moreover, copolymerization can be carried out in dispersion with the aid of a redox system used in conjunction with one or more of the class of peroxide catalysts, organic or inorganic, typical of which are benzoyl peroxide, acetyl peroxide, caproyl peroxide, butyl perbenzoate, butyl hydroperoxide, and the like. Likewise, conditions are substantially like those described above.

Typical vinylidene compounds for copolymerization or interpolymerization include acrylic and methacrylic acids, their esters, amides, salts, nitriles, acrylonitrile, styrene, and its homologues and analogues. Specific vinylidene compounds are methyl, ethyl, isopropyl, butyl, tert-butyl, octyl, dodecyl, octadecyl, octenyl, or oleyl acrylates, or octyl, dodecyl, octadecyl, octenyl, or oleylacrylates or methacylates, tert-butylaminoethyl acrylate or methacrylate, dimethylaminopropyl acrylate or methacrylate, N-methylacrylamide, N-butylmethacrylamide, dimethylaminoethylacrylamide, dimethylaminopropylacrylamide, or the comparable acrylamides, $\alpha$-methylstyrene, p-methylstyrene, p-chlorostyrene, vinylnaphthalene, and the like. When two or more free radical polymerizable vinylidene groups occur, as in divinylbenzene, ethylene diacrylate or methacrylate, in trivinylbenzene (bisvinyloxyethyl)urea, or vinyloxyethyl acrylate or methacrylate, insoluble interpolymers result.

Interpolymerization may be effected in bulk, solution, emulsion, or in suspension. A wide range of compositions may be used. Copolymers are preferably constituted with 5% to 95% of one or more of the 2-vinyl and 2-isopropenyl substituted oxazolines and identically substituted oxazines and the spirans formed therefrom. Even proportions up to 99% can be used where a minor variation in the polymeric compounds of this invention is desired, while as little as 0.5% of these compounds in some cases influence the properties of a polymerizable vinylidene compound. Generally, 0.5 to 50% of the monomer of this invention is used to modify the nature of another kind of vinylidene polymer.

The polymers and copolymers of the compounds of this invention are useful in coating compositions, in textile finishing compositions, as adhesives, as paper treating agents, as an additive to viscose dopes, and cellulose acetate dopes to improve the properties of fibers and films formed therefrom. The monomers are also useful to impregnate leather, in which upon penetration into the cells, they may be copolymerized and permanently retained. The copolymers of this invention are not only useful for the coating of metals and rigid articles in general, but they are also very useful for coating textiles and paper. They provide very durable, tough, crease proof coatings for paper and textiles. The polymers are very effective potentiators; they prevent the resettlement of soil and dirt particles when used in synthetic detergents. When small amounts of the polymers are compounded with the various synthetic detergents, there are obtained effective potentiators. A further use for the polymers is as an antistatic compound which imparts antistatic characteristics to cloth.

The polymers of the compounds of this invention, upon copolymerization with polyvinylidene monomers, can be lightly cross-linked. As the reaction occurs the product becomes increasingly insoluble and there is obtained a resin which has anion-exchange capacity and, which, on being granulated, is suitable for use in conventional commercial column operation. The resins prepared from these polymers are hydrophobic, thus allowing diffusion of ions through the structure at a finite and usable rate. By lightly cross-linking a resin of higher porosity, a resin of lower density and higher order of hydration is formed. Such resins have an advantageous higher rate of ionic diffusion, higher rate of exchange, and higher capacity for ions of high molecular weight. For example, they permit recovery and removal of high molecular weight ions that are too large to diffuse into the resin structures of the less porous and denser resins.

The polymers of the compounds of this invention are useful to prepare quaternary ammonium type anion-exchange resins with alkyl halides. The quaternary salt is readily obtained by reacting the polymer with methyl iodide.

In the following illustrative examples there is shown the preparation of polymers and copolymers of some of the 5,6-dihydro-4H-1,3-oxazines and oxazolines of this invention. All parts are by weight.

*Example A*

A portion of 100 parts of 2-isopropenyl-4,4-dimethyloxazoline is mixed with two parts of dimethyl azoisobutyrate as catalyst. The mixture is heated at 75° C. for 24 hours under a nitrogen atmosphere. The hard, clear polymer which is obtained is precipitated out when poured into hot water. The polymer dissolves in cold water or benzene. The dissolved polymer in benzene is poured into pentane. The product is dried at 60° C. at 0.5 mm. The white powder collected is white, hygroscopic polymeric material of the correct analysis. The polymer dissolved in benzene shows an azomethine peak at 1658 cm.$^{-1}$. The solution in water is weakly basic to alkacid test paper.

The polymeric powder is a useful textile, sizing being soluble in water and readily applied from aqueous solutions.

*Example B*

A solution is made up of ten parts of 2-isopropenyl-4,4-dimethyloxazoline, 90 parts of methyl methacrylate in toluene and 0.2 part of dimethyl azoisobutyrate. The mixture is blanketed with nitrogen and heated for four hours at 75° C. Ten parts of xylene are added and the solution is heated under reflux yielding a very viscous gum which, in xylene, gives a yellow solution of Gardner-Holdt viscosity of B. It is cast on glass giving upon drying a hard, clear, colorless film. The solution is poured into pentane. Upon precipitation, washing and drying at 60° C., there results a white powder which analyzes 0.98% nitrogen (calculated as 1.01%).

*Example C*

A mixture of 50 parts of 2-isopropenyl-4,4-dimethyloxazoline, 2.5 parts of divinylbenzene with 0.5 part of azodi-isobutyronitrile as catalyst is prepared. The air is displaced by nitrogen and the mixture after heating for four hours at 75° C. resulted in a hard, brittle, translucent resin.

Example D

There are mixed ten parts of 2-isopropenyl-4,4-dimethyl-5,6-dihydro-4H-1,3-oxazine with 100 parts of acrylonitrile in the presence of dimethylazoisobutyrate 0.1 part; there is obtained a copolymer which, upon application to woolen fabrics, imparts shrink resistance.

In place of acrylonitrile there is used methyl methacrylate, ethyl methacrylate, or butyl, propyl, and tert-butyl methacrylate with formation in each case of a copolymer useful for coating. Also in place of the above acrylonitrile there may be used mixtures of methyl methacrylate and ethyl, propyl, and butyl acrylate.

Example E

About ten parts of resin and 60 parts of methyl iodide are refluxed together for ten hours. The product after washing and drying is analyzed and shows about 50% conversion to the quaternary type anion-exchange resin. The other heterocyclic compounds of this invention are similarly converted into useful quaternary anion-exchange resins.

In a similar manner, 2 - vinyl - 4,4 - dimethyloxazoline, 2 - isopropenyl - 4,4 - dimethyl - 5,6 - dihydro - 4H - 1,3-oxazine, 2 - vinyl - 4,4 - dimethyl - 5,6 - dihydro - 4H-1,3-oxazine, the corresponding 4,4-alkyl substituted vinyl and isopropenyl-5,6-dihydro-4H-1,3-oxazines, the oxazolines, and the respective spirans thereof are conveniently polymerized and copolymerized forming the corresponding useful polymeric materials. All the above examples serve to illustrate this invention.

It is apparent to one skilled in the art that variations of the described procedure can be made without departing from the spirit of this invention which is one of heating one mole of a primary aminoalcohol described above with preferably at least two moles of a lower alkyl ester of acrylic or methacrylic acid, at a reacting overhead temperature from about the boiling point of the azeotropic mixture of the unsaturated ester and the alkanol formed thereof, to about the boiling point of the unsaturated ester, that is at an overhead temperature within the range of about 62.5° to about 163° C., while preferably maintaining the temperature in the pot from about 100° to about 130° C., or alternatively heating under reduced pressure at correspondingly lower pot and overhead temperatures, in the presence of a lower metallic-alkoxide catalyst, the metallic component thereof being selected from the metals of an atomic number from 13 to 40 inclusive and within groups III–A and IV–B of the periodic table, in the presence of a polymerization inhibitor, distilling off the alcohol R⁴OH and separating the 2-isopropenyl or vinyl substituted oxazolines, the identically substituted 5,6-dihydro-4H-1,3-oxazines, or the respective spirans thereof.

We claim:

1. A new composition of matter of the formula:

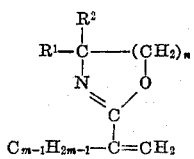

in which $R^1$ and $R^2$, when taken individually, are alkyl radicals one being methyl and the other containing from one to eight carbon atoms, $R^1$ and $R^2$, when taken together, form a divalent saturated aliphatic hydrocarbon group containing four to nine carbon atoms which together with the carbon atom unto which $R^1$ and $R^2$ are both bonded form a five- to six-sided carbocycle, $n$ is an integer from 1 to 2 inclusive, and $m$ is an integer from one to two inclusive.

2. A new composition of matter of the formula:

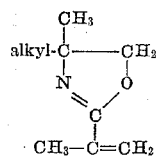

where the alkyl radical contains from one to eight carbon atoms.

3. A new composition of matter of the formula:

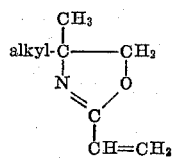

where the alkyl radical contains from one to eight carbon atoms.

4. A new composition of matter of the formula:

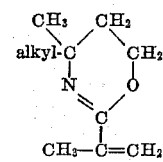

where the alkyl radical contains from one to eight carbon atoms.

5. A new composition of matter of the formula:

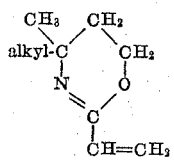

where the alkyl radical contains from one to eight carbon atoms.

6. 2-isopropenyl-4,4-dimethyloxazoline.
7. 2-isopropenyl-4-methyl-4-hexyloxazoline.
8. 2-vinyl-4,4-dimethyloxazoline.
9. 2 - isopropenyl - 4,4 - dimethyl - 5,6 - dihydro - 4H-1,3 - oxazine.
10. 2′-isopropenyl-spiro[cyclohexane-1,4′-oxazoline].
11. A process for preparing compounds of the structure

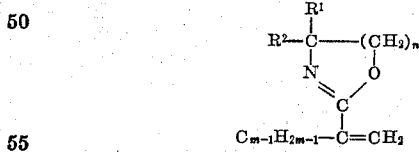

which comprises reacting by heating together (1) an alkanolamine of the formula $$HO-(CH_2)_n-C(R^1)(R^2)-NH_2$$

in which $n$ is an integer from one to two inclusive, $R^1$ and $R^2$, when taken individually, are alkyl radicals one being methyl and the other containing from one to eight carbon atoms, $R^1$ and $R^2$, when taken together, form a divalent saturated aliphatic hydrocarbon group containing four to nine carbon atoms which together with the carbon atom onto which $R^1$ and $R^2$ are both bonded form a five- to six-sided carbocycle, (2) an unsaturated ester of the structure $$CH_2=C(C_{m-1}H_{2m-1})COOR^3$$

in which $m$ is an integer from one to two inclusive, $R^3$ is an alkyl radical containing one to four carbon atoms, at a reacting overhead temperature from about the boiling point of the azeotropic mixture consisting of the above defined unsaturated ester and the alkanol, $R^3OH$, derived therefrom, to about the boiling point of the said unsaturated ester, in the presence of an organometallic catalyst of the formula M(OR⁴)$_x$, in which M is a metal of an atomic number ranging from 13 to 40 selected from groups III–A and IV–B of the periodic table, $x$ has the same numerical value as the valency of the metal M, R⁴ is a lower alkyl radical containing from one to five carbon atoms, in the presence of a polymerization inhibitor, distilling off an alcohol R³OH, and recovering a compound of the structure described above.

12. The process of claim 11 in which the alkanolamine and the unsaturated ester are heated together to first distill off a substantial part of the water from the said reactants.

13. A process for preparing compounds of the structure of claim 11, which comprises the steps of (1) heating one mole of an alkanolamine as defined in claim 11, and at least two moles of an unsaturated ester as defined in claim 11, (2) adding an alkanometallic catalyst of the formula M(OR⁴)$_x$, in which M is a metal of an atomic number ranging from 13 to 40 selected from groups III–A and IV–B of the periodic table, $x$ has the the same numerical value as the valency of the metal M, R⁴ is a lower alkyl radical containing from one to five carbon atoms, and a polymerization inhibitor, (3) heating at a reacting temperature from about the boiling point of the azeotropic mixture consisting of the above defined ester and the alkanol R⁴OH derived therefrom, to about the boiling point of the said unsaturated ester, (4) distilling off the alcohol R³OH and, (5) recovering a compound of the structure described above.

14. The process of claim 13 which is being carried out under reduced pressure at correspondingly lower temperatures.

15. A process for preparing 2-isopropenyl-4,4-dimethyloxazoline which comprises (1) heating 2-amino-2-methylpropanol together with methyl methacrylate, (2) adding an alkanometallic catalyst of the formula $$M(OR^4)_x$$

in which M is a metal of an atomic number ranging from 13 to 40 selected from groups III–A and IV–B of the periodic table, $x$ has the same numerical value as the valency of the metal M, R⁴ is a lower alkyl radical containing from one to five carbon atoms, and a polymerization inhibitor, (3) heating at a reacting temperature from about 64.0° to about 100.6° C., (4) distilling off the methanol and (5) recovering the 2-isopropenyl-4,4-dimethyloxazoline.

16. A process for preparing 2-isopropenyl-4-methyl-4-hexyloxazoline which comprises (1) heating 2-amino-2-methyl-1-octanol together with methyl methacrylate, (2) adding an alkanometallic catalyst of the formula $$M(OR^4)_x$$

in which M is a metal of an atomic number ranging from 13 to 40 selected from groups III–A and IV–B of the periodic table, $x$ has the same numerical value as the valency of the metal M, R⁴ is a lower alkyl radical containing from one to five carbon atoms, and a polymerization inhibitor, (3) heating at a reacting temperature from about 64.0° to about 100.6° C., (4) distilling off the methanol and (5) recovering the 2-isopropenyl-4-methyl-4-hexyloxazoline.

17. A process for preparing 2-vinyl-4,4-dimethyloxazoline which comprises (1) heating 2-amino-2-methylpropanol together with methyl acrylate, (2) adding an alkanometallic catalyst of the formula M(OR⁴)$_x$, in which M is a metal of an atomic number ranging from 13 to 40 selected from groups III–A and IV–B of the periodic table, $x$ has the same numerical value as the valency of the metal M, R⁴ is a lower alkyl radical containing from one to five carbon atoms, and a polymerization inhibitor, (3) heating at a reacting temperature from about 64.0° to about 100.6° C., (4) distilling off the methanol and, (5) recovering the 2-vinyl-4,4-dimethyloxazoline.

18. A process for preparing 2-isopropenyl-4,4-dimethyl-5,6-dihydro-4H-1,3-oxazine which comprises (1) heating 3-amino-3-methyl-1-butanol together with methyl methacrylate, (2) adding an alkanometallic catalyst of the formula M(OR⁴)$_x$, in which M is a metal of an atomic number ranging from 13 to 40 selected from groups III–A and IV–B of the periodic table, $x$ has the same numerical value as the valency of the metal M, R⁴ is a lower alkyl radical containing from one to five carbon atoms, and a polymerization inhibitor, (3) heating at a reacting temperature from about 64.0° to about 100.6° C., (4) distilling off the methanol and, (5) recovering the 2-isopropenyl-4,4-dimethyl-5,6-dihydro-4H-1,3-oxazine.

19. A process for preparing 2'-isopropenyl-spiro[cyclohexane-1,4'-oxazoline] which comprises (1) heating 1-amino-1-(α-hydroxymethyl)cyclohexane together with methyl methacrylate, (2) adding an alkanometallic catalyst of the formula M(OR⁴)$_x$, in which M is a metal of an atomic number ranging from 13 to 40 selected from groups III–A and IV–B of the periodic table, $x$ has the same numerical value as the valency of the metal M, R⁴ is a lower alkyl radical containing from one to five carbon atoms, and a polymerization inhibitor, (3) heating at a reacting temperature from about 64.0° to about 100.6° C., (4) distilling off the methanol and, (5) recovering the 2'-isopropenyl-spiro[cyclohexane-1,4'-oxazoline].

References Cited in the file of this patent

UNITED STATES PATENTS

| | | |
|---|---|---|
| 913,514 | Konig | Feb. 23, 1909 |
| 2,243,295 | Susie et al. | May 27, 1941 |
| 2,623,013 | D'Alelio | Dec. 23, 1952 |
| 2,634,259 | Ney et al. | Apr. 7, 1953 |
| 2,665,271 | Beller | Jan. 5, 1954 |
| 2,739,948 | D'Alelio | Mar. 27, 1956 |